United States Patent
Rahman

(10) Patent No.: US 12,323,876 B2
(45) Date of Patent: Jun. 3, 2025

(54) CATEGORIZE A LOCATION OF A MOBILE DEVICE IN RELATION TO A CELL TOWER OF A WIRELESS TELECOMMUNICATION NETWORK

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 524 days.

(21) Appl. No.: 17/740,119

(22) Filed: May 9, 2022

(65) Prior Publication Data

US 2023/0362583 A1    Nov. 9, 2023

(51) Int. Cl.
| | |
|---|---|
| H04W 4/02 | (2018.01) |
| H04W 4/021 | (2018.01) |
| H04W 56/00 | (2009.01) |
| H04W 64/00 | (2009.01) |

(52) U.S. Cl.
CPC .......... *H04W 4/023* (2013.01); *H04W 4/021* (2013.01); *H04W 56/0045* (2013.01); *H04W 56/0055* (2013.01); *H04W 64/00* (2013.01)

(58) Field of Classification Search
None
See application file for complete search history.

(56) References Cited

U.S. PATENT DOCUMENTS

| | | |
|---|---|---|
| 6,697,630 B1 | 2/2004 | Corwith |
| 7,076,237 B2 | 7/2006 | Dawson et al. |
| 7,158,798 B2 | 1/2007 | Lee et al. |
| 7,558,558 B2 | 7/2009 | Langsenkamp et al. |
| 7,606,568 B2 | 10/2009 | Gallagher et al. |
| 7,933,598 B1 | 4/2011 | Agrawal et al. |
| 8,099,113 B2 | 1/2012 | Morrison |
| 8,145,190 B2 | 3/2012 | Caldwell et al. |
| 8,155,670 B2 | 4/2012 | Fullam et al. |
| 8,189,549 B2 | 5/2012 | Caldwell et al. |
| 8,238,267 B2 | 8/2012 | Dwyer et al. |
| 8,380,184 B2 | 2/2013 | Kamdar et al. |

(Continued)

FOREIGN PATENT DOCUMENTS

| | | |
|---|---|---|
| CN | 107251599 A | 10/2017 |
| CN | 104205936 B | 11/2018 |

(Continued)

*Primary Examiner* — Adolf Dsouza
(74) *Attorney, Agent, or Firm* — Perkins Coie LLP

(57) ABSTRACT

Multiple regions around a cell tower provide coverage to a UE. The multiple regions describe the location of the UE in relation to the cell tower. The multiple regions include a near region and a far region. The system sends a request to the UE to provide an indication of a distance between the UE and the cell tower. Based on the distance between the UE and the cell tower, the system categorizes the location of the UE in relation to the cell tower into one of the multiple regions. The system receives an indication of a problem in a communication between the UE and the wireless telecommunication network. Based on the one of the multiple regions into which the location of the UE is categorized, the system determines a likely source of the problem such as the UE, a radio network, or a core network.

20 Claims, 6 Drawing Sheets

(56) References Cited

U.S. PATENT DOCUMENTS

| | | |
|---|---|---|
| 8,494,566 B2 | 7/2013 | Chen et al. |
| 8,744,480 B2 | 6/2014 | Daly |
| 9,020,523 B2 | 4/2015 | Moeglein et al. |
| 9,049,545 B2 | 6/2015 | Duggal et al. |
| 9,167,068 B2 | 10/2015 | Chou |
| 9,172,593 B2 | 10/2015 | Kane |
| 9,301,155 B2 | 3/2016 | Caldwell et al. |
| 9,392,572 B2 | 7/2016 | Naaman |
| 9,585,037 B1 | 2/2017 | Davari et al. |
| 9,609,500 B2 | 3/2017 | Noonan et al. |
| 9,635,505 B2 | 4/2017 | Murphy et al. |
| 9,635,534 B2 | 4/2017 | Maier et al. |
| 9,661,504 B1 | 5/2017 | Hagstrum et al. |
| 9,681,367 B2 | 6/2017 | Hassan et al. |
| 9,769,609 B1 | 9/2017 | Burcham et al. |
| 9,838,108 B2 | 12/2017 | Daijavad et al. |
| 9,838,888 B2 | 12/2017 | Lihosit et al. |
| 9,854,501 B2 | 12/2017 | Mitchell et al. |
| 9,860,731 B1 | 1/2018 | Noonan |
| 9,955,024 B2 | 4/2018 | Caldwell et al. |
| 10,334,488 B2 | 6/2019 | Periyasamy et al. |
| 10,374,690 B2 | 8/2019 | Singhal |
| 2003/0130864 A1 | 7/2003 | Ho et al. |
| 2005/0143097 A1 | 6/2005 | Wilson et al. |
| 2006/0141923 A1 | 6/2006 | Goss |
| 2006/0142020 A1 | 6/2006 | Mueckenheim et al. |
| 2006/0252461 A1 | 11/2006 | Grant et al. |
| 2007/0218881 A1* | 9/2007 | Voyer ............... H04W 60/04 455/414.1 |
| 2009/0227251 A1 | 9/2009 | Lei et al. |
| 2009/0291630 A1 | 11/2009 | Dunn et al. |
| 2014/0204091 A1 | 7/2014 | Lowndes |
| 2015/0074009 A1 | 3/2015 | Williams |
| 2018/0367667 A1 | 12/2018 | Tran |
| 2021/0337400 A1 | 10/2021 | Jat et al. |
| 2021/0360427 A1 | 11/2021 | Jat |
| 2021/0400512 A1 | 12/2021 | Agarwal et al. |
| 2022/0021770 A1 | 1/2022 | Zhang et al. |
| 2022/0086713 A1 | 3/2022 | Määttänen et al. |

FOREIGN PATENT DOCUMENTS

| | | |
|---|---|---|
| DE | 102020110447 A1 | 1/2021 |
| EP | 0935893 A1 | 8/1999 |
| EP | 2127407 A1 | 12/2009 |
| EP | 2898342 A2 | 7/2015 |
| EP | 3062483 A1 | 8/2016 |
| EP | 3202172 A1 | 8/2017 |
| EP | 3180906 B1 | 3/2019 |
| EP | 3414926 B1 | 12/2020 |
| EP | 2443871 B1 | 12/2021 |
| JP | 2008193686 A | 8/2008 |
| JP | 2015104129 A | 6/2015 |
| JP | 2018526937 A | 9/2018 |
| JP | 6571189 B2 | 8/2019 |
| KR | 101631630 B1 | 6/2016 |
| WO | 2010102149 A2 | 9/2010 |
| WO | 2010102242 A2 | 9/2010 |

* cited by examiner

CATEGORIZE A LOCATION OF A MOBILE DEVICE IN RELATION TO A CELL TOWER OF A WIRELESS TELECOMMUNICATION NETWORK

BACKGROUND

A call detail record (CDR) is a data record produced by a telephone exchange or other telecommunications equipment that documents the details of a telephone call or other telecommunications transactions (e.g., text message) that passes through that facility or device. The CDR does not include the content of that transaction, but rather contains various attributes of the call, such as time, duration, completion status, source number, and destination number. The geolocation granularity of the user equipment (UE) recorded in the CDR is nothing more than the cell tower identifier (ID). Unfortunately, the cell tower ID leaves a lot of ambiguity as to the location of the UE because the cell tower ID can span an area 45 miles in radius.

BRIEF DESCRIPTION OF THE DRAWINGS

Detailed descriptions of implementations of the present invention will be described and explained through the use of the accompanying drawings.

Figure 1:
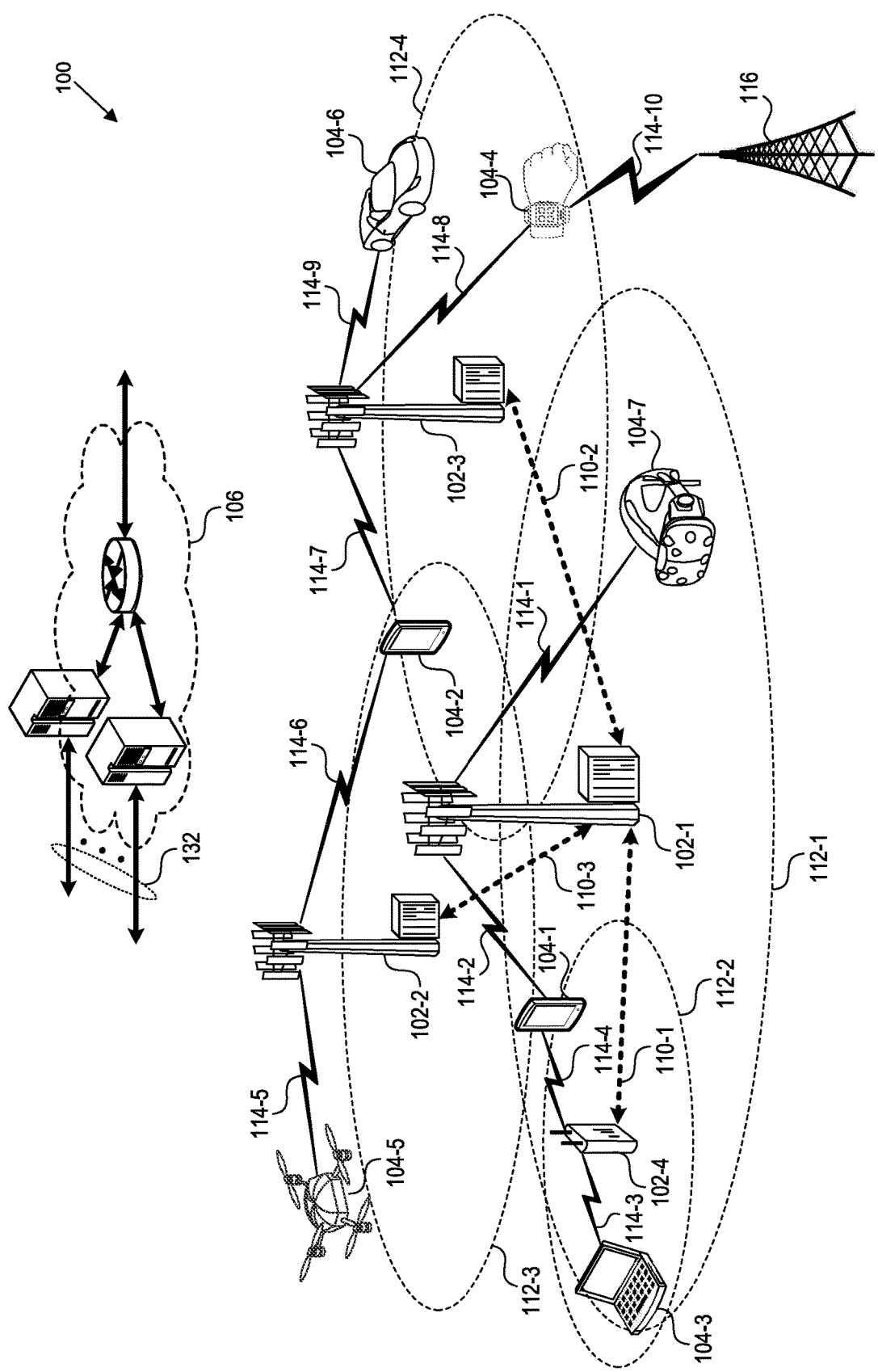
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method to use a CDR to categorize a location of a mobile device in relation to a cell tower associated with a wireless telecommunication network, such as a 5G network. The system can define multiple regions associated with the cell tower providing coverage to the mobile device, where the multiple regions describe the location of the mobile device in relation to the cell tower. The multiple regions can include a near region, a middle region, and a far region. For example, if the total coverage of the cell tower is 7 miles, the near region can be less than a 1-mile radius from the cell tower, the middle region can be between a 1-mile and a 5-mile radius from the cell tower, and the far region can be more than 5 miles from the cell tower.

The system can periodically send a request to the mobile device to provide an indication of a propagation delay associated with the mobile device, where the propagation delay indicates a distance between the mobile device and the cell tower. For example, the larger the distance between the cell tower and the mobile device, the larger the propagation delay. Based on the propagation delay, the system can categorize the location of the mobile device in relation to the cell tower into one of the multiple regions associated with the cell tower, and record the categorization into the CDR. The system can receive an indication of a problem in a communication between the mobile device and the wireless telecommunication network. The problem can include dropped calls, slow uplink or downlink, lack of coverage, etc. Based on the one of the multiple regions into which the location of the mobile device is categorized, the system can determine a likely source of the problem, such as whether the problem is within the mobile device, a radio network, or a core network.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
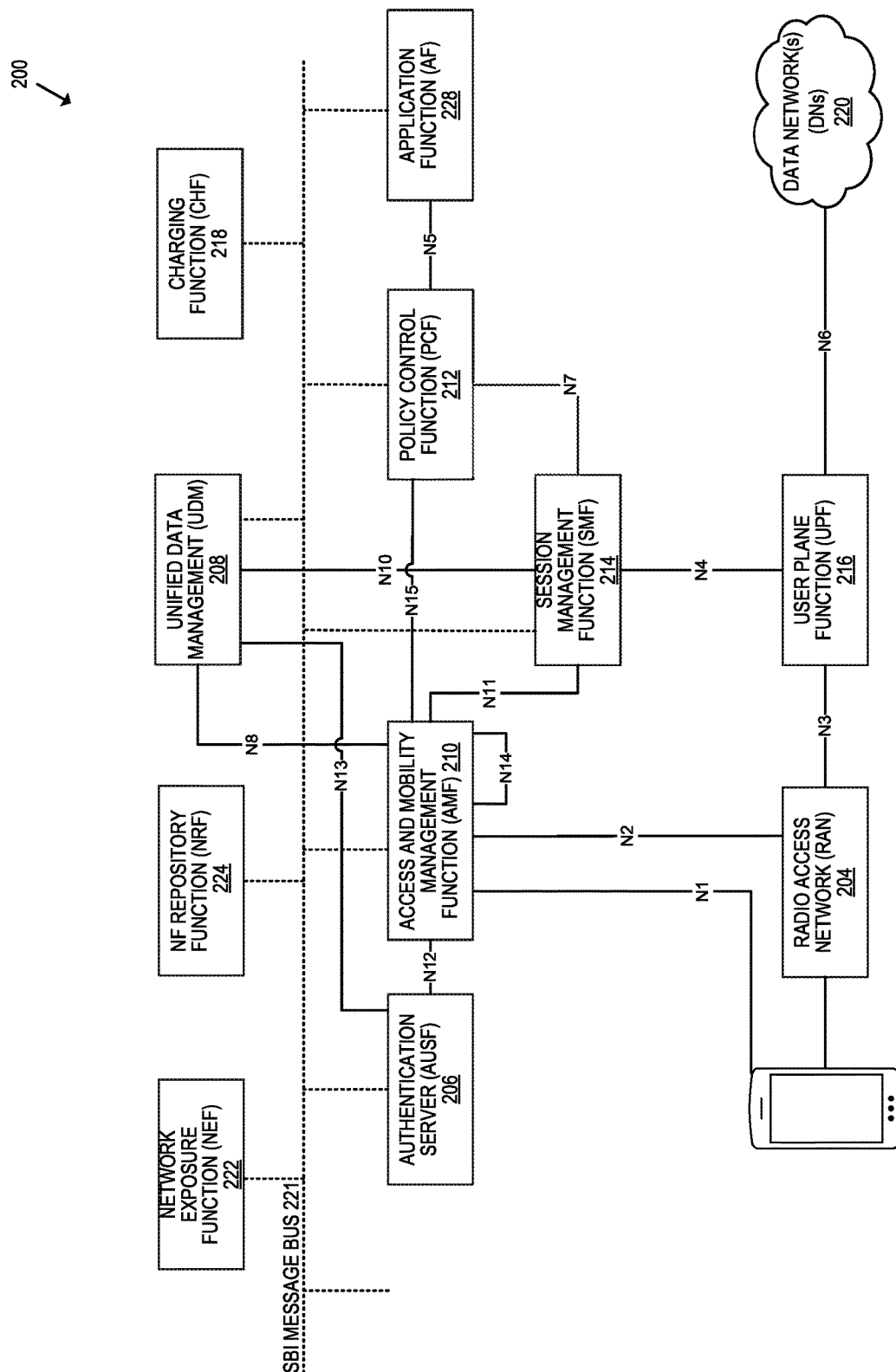
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a Radio Access Network (RAN) 204. The NFs include an Authentication Server Function (AUSF) 206, a Unified Data Management (UDM) 208, an Access and Mobility Management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), serving to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical quality of service and charging rules, includes network slice selection, which is regulated by the NSSF 226.

Figure 3:
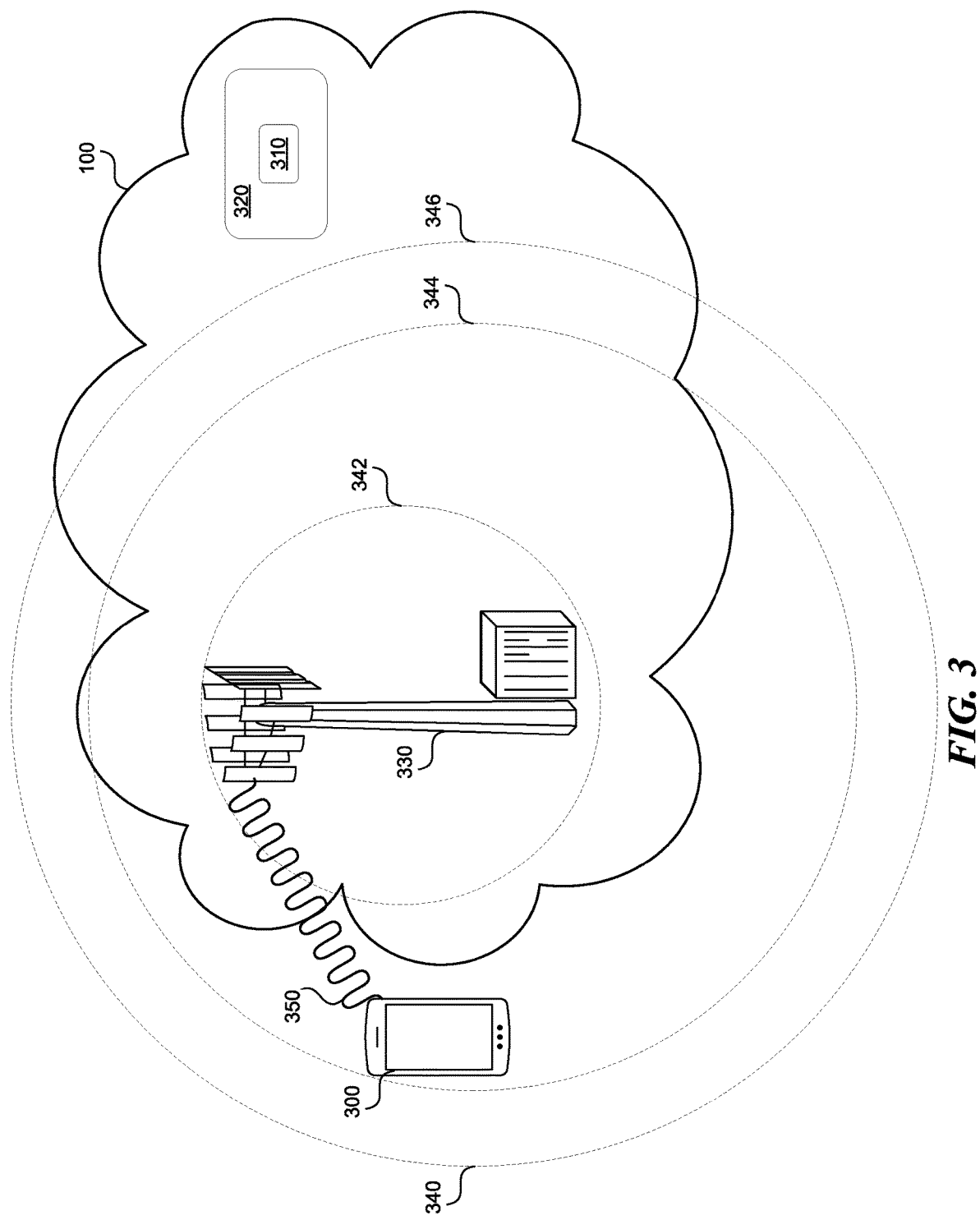
FIG. 3 shows a system to determine a location of a UE.

Categorize a Location of a Mobile Device in Relation to a Cell Tower of a Wireless Telecommunication Network FIG. 3 shows a system to determine a location of a UE. The geolocation of the UE 300 engaged in data, messaging, or voice session is of utmost importance to a network 100. Further, the geolocation of the UE 300 is even more helpful if the geolocation is recorded in a CDR 310.

For any voice, data, or messaging in a network 100, there is always a CDR 310 record that is generated in core network 320 for any generation of cellular technology, such as 3G, 4G, 5G. Currently, the CDR contains an indication of geolocation at the granularity of the cell tower identifier (ID). The cell tower ID identifies the cell tower 330, however, the coverage of the cell tower 330 can extend over the region 340, which can span a radius of up to 45 miles. Consequently, the cell tower ID provides a very vague location of the UE 300. The cell tower 330 can be eNB when the network 100 is a 4G network, and gNB when the network 100 is a 5G network.

The network 100 can use propagation delay to determine the location of the UE 300 at a finer granularity than the cell tower ID. The network 100 can determine the region 340 based on the radio frequency of the communication 350 between the UE 300 and the cell tower 330. The lower the frequency of the communication 350, the larger the region 340, because lower frequency waves transfer less energy into the medium, such as the air, the ground, and various obstacles.

Upon determining the region 340, the system can define the near region 342, the middle region 344, and the far region 346. For example, if the region 340 for a specific radio frequency of the communication 350 has a 7-mile radius, then 0 to 1 mile could be the near region 342, 1 to 5 miles could be the middle region 344, and 5 to 7 miles could be the far region 346. Each country and mobile operator has different operating frequency range. For example, for T-Mobile USA, below are the range of frequencies: Band n71 (600 MHz), Band n41 (2.5 GHz), Band n258 (24 GHz), Band n260 (39 GHz), Band 261 (28 GHz). For 4G LTE, T-Mobile USA's operating frequencies are: Band 12 (700 MHz), Band 71 (600 MHz), Band 2 (1900 MHz), Band 5 (850 MHz), Band 4 (1700/2100 MHz), Band 66 (Extension of band 4 on 1700/2100 MHz)].

In one embodiment, to determine which region 342, 344, 346 the UE 300 is located in, the network 100 can rely on a timing advance (TA) mechanism, which is an established, native 3GPP-compliant method in cellular communication. TA allows the base station to achieve accurate timing alignment. In some cases, TA can stand for timing alignment, and can be used interchangeably. Timing advance is a negative offset, at the UE, between the start of a received downlink subframe and a transmitted uplink subframe to ensure that the downlink and the uplink subframes are synchronized at the mobile radio base station, e.g. e-NB for 4G LTE and g-NB for 5G NR.

The TA compensates for propagation delay, which is variable depending on where the UE 300 is located in reference to cell tower 330. The UE 300 closer to the cell tower 330, e.g., in the near region 342, experiences lower propagation delay than the UE farther from the cell tower, e.g., in the far region 346. The UE 300 can continuously update the TA based on the propagation delay between the UE's location and the location of the cell tower 330. A periodic timer in the cell tower 330 can, at a predetermined interval, cause the cell tower 330 to request the UE 300 to send the UE's TA value. The TA value gives to the network 100 an indication of a distance between the UE 300 and the cell tower 330. Thus, based on the TA value, the network 100 can categorize the location of the UE 300 into one of the three regions 342, 344, 346. The network 100 can map the first predetermined range of lower TA values to near region 342, a predetermined range higher than the first predetermined range of TA values to middle region 344, and the highest predetermined range of TA values to far region 346. The propagation characteristics of different frequencies are different and, accordingly, the UE 300 has to also consider the frequency of the communication. The frequency of the communication can also be part of the decision tree of this geolocation classification mechanism.

Each electromagnetic frequency as it propagates reacts differently in terms of fading, path loss, obstruction, and environmental loss etc. The lower the electromagnetic frequency, the higher the distance the frequency can travel as path losses are smaller compared to higher frequencies. Likewise, the higher the electromagnetic frequency, the lower the distance it can travel as signal quality and strength subsides due to high fading and path loss.

In another embodiment, to determine which region 342, 344, 346 the UE 300 is located in, the network 100 can rely on the fact that the signal strength decreases with greater distance between the UE 300 and the cell tower 330. For example, Reference Signal Received Power (RSRP), Reference Signal Received Quality (RSRQ), Signal to Noise or Interference Ratio (SINR) can be used to indicate the distance between the UE 300 and the cell tower 330. RSRP is the power of the reference signals spread over the full bandwidth and narrowband. RSRP decreases with increasing distance between the UE 300 and the cell tower 330. RSRP levels for a usable signal typically range from about −75 dBm in the near region 342 to −120 dBm at the outer edge of the far region 340. RSRQ indicates the quality of the received reference signal. The RSRQ measurement provides additional information when RSRP is not sufficient to make a reliable handover or cell reselection decision. RSRQ also decreases with increasing distance between the UE 300 and the cell tower 330. RSRQ varies from −3 dB in the near region 342 to −19.5 dB in the far region 346. SINR is calculated as the useful power in watts divided by the sum of interference and noise. SINR also decreases with increasing distance between the UE 300 and the cell tower 330.

A UE 300 measures RSRP, RSRQ, and SINR. The network 100 can periodically request the measurements of RSRP, RSRQ, and/or SINR to determine the distance between the UE 300 and the cell tower 330.

Figure 4:
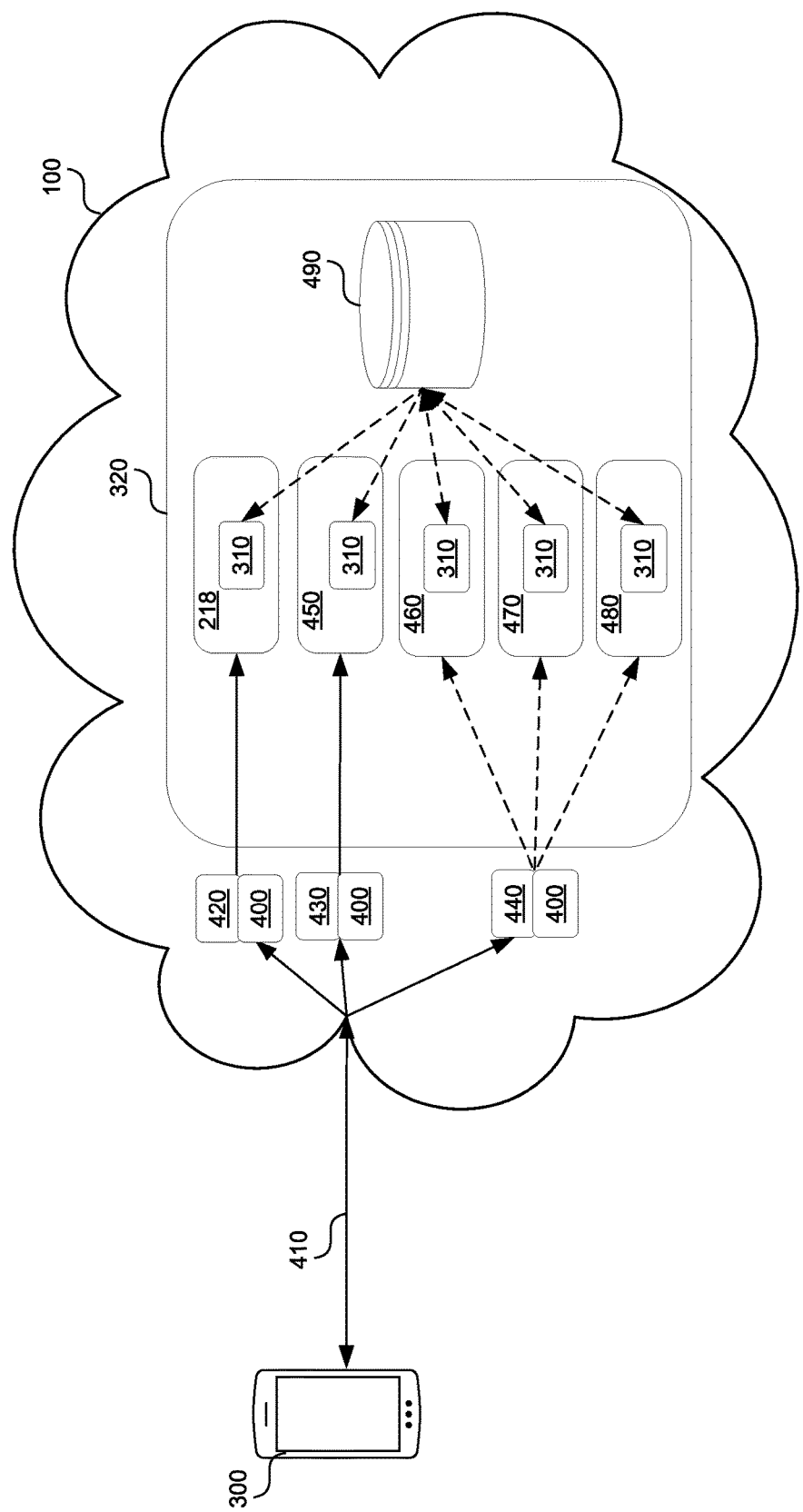
FIG. 4 shows propagation of the classification information to the core network.

FIG. 4 shows propagation of the classification information to the core network. Once the network 100 classifies the UE 300 into one of the regions 342, 344, 346 in FIG. 3, the network can propagate the classification information to the core network 320.

To propagate the region classification information 400, the network can classify the communication 410 between the UE 300 and the network 100 into a data session 420, voice call 430, or messaging 440. The region classification information 400 includes whether the UE 300 is classified in the near region 342 in FIG. 3, the middle region 344 in FIG. 3, or the far region 346 in FIG. 3. To classify the communication 410 into the data session 420, the network 100 can determine whether the communication includes video streaming, such as YouTube or Netflix. To classify the communication 410 into the messaging 440, the network 100 can determine whether the communication includes short message service (SMS), IP multimedia subsystem (IMS), or rich communication service (RCS) messaging.

To classify the communication 410 into the voice call 430, the network 100 can determine whether the voice call includes Voice over LTE (VOLTE) calls in a 4G network, Voice over New Radio (VoNR) calls in a 5G network, Voice over Evolved Packet System Fallback (VoEPSFB) calls in a 5G network, or Voice over Radio Access Technology Fallback (VoRATFB) in a 5G network. The VoNR feature provided in 5G is similar to VOLTE in 4G. In VONR, the UE 300 engages with the 5G network, and both voice and data services are provided on the 5G network with gNB. In VoEPSFB, if the UE 300 tries to use voice services in a 5G network that does not support VONR, gNB redirects or performs a handover to the LTE network, and consequently the UE is able to use voice services via VOLTE. After the voice session is terminated, the UE can move back to the 5G network. VoRATFB is similar to VoEPSFB except that the UE 300 falls back to the eLTE network controlled by the 5G core during the voice session.

If the communication 410 is the data session 420, the CHF 218 generates the CDR 310. The UE 300 does not talk with the CHF 218 directly. However, the UE 300 interacts with NAS session management anchor SMF 214 in FIG. 2 via gNB AMF 210 in FIG. 2. Consequently, the UE 300 provides classification information 400 to the core network 320.

If the communication 410 is the voice call 430, the CDR generation point is contained in the IMS core. The network function that generates the CDR 310 for a voice call in IMS is TAS (Telephony Application Server) 450. The UE 300 can provide the classification information 400 over SIP (Session Initiation Protocol) to IMS, which then repropagates the classification information to TAS 450. Finally, TAS 450 records the classification information 400 in the CDR 310.

If the communication 410 is the messaging 440, depending on the type of the message such as SMS, IMS, or RCS, the messaging server SMS 460, IMS messaging server (IMP) 470, or RCS application server 480, respectively, can include the classification information 400 in the CDR 310. Once a distance estimation is derived and categorized, to communicate that to the core network where call detail records (CDR) s are generated, the distance estimation can be carried on exiting protocols that are used between UE and IMS core network. For Voice call service, the signaling protocol used is SIP (session initiation protocol) and to incorporate this new value of distance estimation, the SIP protocol can incorporate a new information element which can then be used to feed this information to core network endpoints. In turn, the core network can use distance estimation to enrich the CDR records with location categorization. For IP Multimedia Systems the signaling protocol TAS (Telephone Application server) can modified to carry the distance estimation.

After the CDR 310 has been created to include the classification information 400, an operator can mine the CDR to determine in which layers the problems are happening most frequently. For example, a database 490 can include a record of issues reported and associated with the network 100. The database 490 and the CDR 310 can include references to each other indicating which issue is associated with which record in the CDR 310. The operator can be an artificial intelligence (AI). For example, In the near region 342, the network coverage is usually better. If the near region 342 in FIG. 3 tends to be the region in which most of the problems reported, then those reports indicate that the problem is not related to the radio network, and instead can be related to the UE 300 and/or the core network 320.

If there are issues such as call drops, call setup failures, text message delivery failure that are happening near cell tower based on the disclosed technology, then the operator can interpret the issues based on the distance between the UE 300 and the cell tower 330. Accordingly to make this finding actionable. Usually, near the cell tower zone, radio signal quality and strength are much better, and it is less likely that those issues can be caused by radio layer challenges. Therefore, operator can then shift towards non-radio related problems for drop problems that are happening at near cell areas. By having clear distinction in location categorization from CDR, the operator can then quickly isolate the drop call samples that may potentially be caused by non-radio or core network related issues and take those samples for core network side investigation. The disclosed technology enables mobile operators engineering teams to faster isolate and narrow down the problem in the appropriate layers of the network in the effort to improve the service level for the customers.

Figure 5:
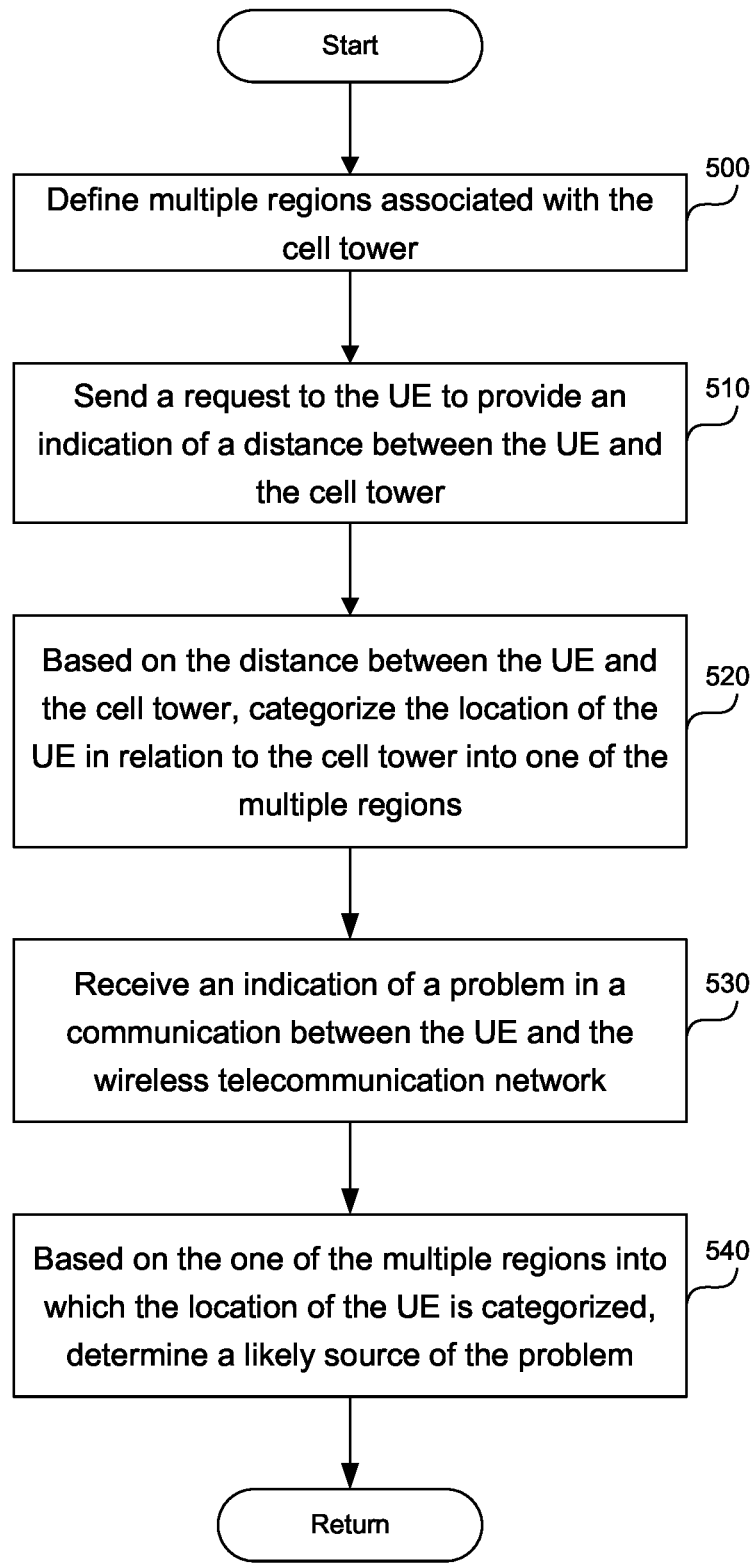
FIG. 5 is a flowchart of a method to categorize a location of a mobile device in relation to a cell tower associated with a wireless telecommunication network.

FIG. 5 is a flowchart of a method to categorize a location of a mobile device in relation to a cell tower associated with a wireless telecommunication network. In step 500, a hardware or software processor executing instructions described in this application can define multiple regions associated with the cell tower that is providing coverage to the UE. The multiple regions describe the location of the UE in relation to the cell tower. The multiple regions include a near region, a middle region, and a far region, where the near region is nearest to the cell tower, the far region is farthest from the cell tower, and the middle region is between the near region and the far region. The regions can vary based on the frequency of the communication between the UE and the cell tower. The near region can include up to 15% of the distance away from the cell tower, the middle region can include between 14% and 72% of the distance away from the cell tower, and the far region can be beyond 70% of the distance to the cell tower.

To define multiple regions associated with the cell tower, the processor can determine a frequency of the communication between the cell tower and the UE. Based on the frequency of the communication, the processor can determine a size of a region around the cell tower that provides a coverage to the UE at the frequency of the communication. The processor can then divide the region around the cell tower into the multiple regions.

In step 510, the processor can send a request to the UE to provide an indication of a distance between the UE and the cell tower. The indication of the distance can be the timing advance defined by 3GPP. The cell tower can send the request to the UE to provide a timing advance defined by 3GPP. The timing advance indicates a propagation delay which is due to the distance between the UE and the cell tower and is proportional to two times the propagation delay. The processor can determine the distance between the UE and the cell tower based on the timing advance. The indication of the distance can also be based on a signal strength received at the UE, such as RSRP, RSRQ, or SINR. All of RSRP, RSRQ, and SINR decrease with increasing distance between the UE and the cell tower, and the difference between RSRP, RSRQ, or SINR at the UE and at the cell tower can indicate the distance between the UE and the cell tower.

In step 520, the processor can, based on the distance between the UE and the cell tower, categorize the location of the UE in relation to the cell tower into one of the multiple regions associated with the cell tower. In step 530, the processor can receive an indication of a problem in a communication between the UE and the wireless telecommunication network. The problem can include dropped calls, slow uplink or downlink, low coverage, etc.

In step 540, the processor can, based on the one of the multiple regions into which the location of the UE is categorized, determine a likely source of the problem. The source of the problem can include the UE, a radio network, or a core network. For example, the processor can determine whether the UE having the problem in communication is in the near region. Upon determining that the UE having the problem in communication is in the near region, the processor can determine that the radio network between the UE and the cell tower is an unlikely source of the problem and that the likely source of the problem is the UE or the core network.

The processor can determine a type of the communication between the UE and the wireless telecommunication network, where the type of the communication includes a data session, a voice call, or a messaging. Upon determining that the type of the communication is the data session, the processor can receive, at an access and mobility management function associated with the wireless telecommunication network, the indication of the distance between the UE and the cell tower. Alternatively or additionally, upon determining that the type of the communication is the voice call, the processor can receive at a telephony application server associated with an IP multimedia subsystem of the wireless telecommunication network the indication of the distance between the UE and the cell tower. Upon categorizing the location of the UE, the processor can store the one of the multiple regions in a CDR.

Alternatively or additionally, upon determining that the type of the communication is the messaging, the processor can receive at a messaging server associated with the wireless telecommunication network the indication of the distance between the UE and the cell tower. The messaging server can include a rich communication services application server, an SMS center, or an IP multimedia subsystem messaging server. An SMS center is a network element in the mobile telephone network. Its purpose is to store, forward, convert, and deliver SMS messages. Upon categorizing the location of the UE, the processor can store the one of the multiple regions in a CDR.

The processor can store multiple indications of multiple problems and the one of the multiple regions, where an indication among the multiple indications is associated with the one of the multiple regions. Based on the multiple indications of multiple problems, the processor can determine a region among the multiple regions in which a majority of the multiple problems occur. Based on the region, the processor can determine a frequent source of the problem. The processor can tag the frequent source of the problem for repair.

Computer System

Figure 6:
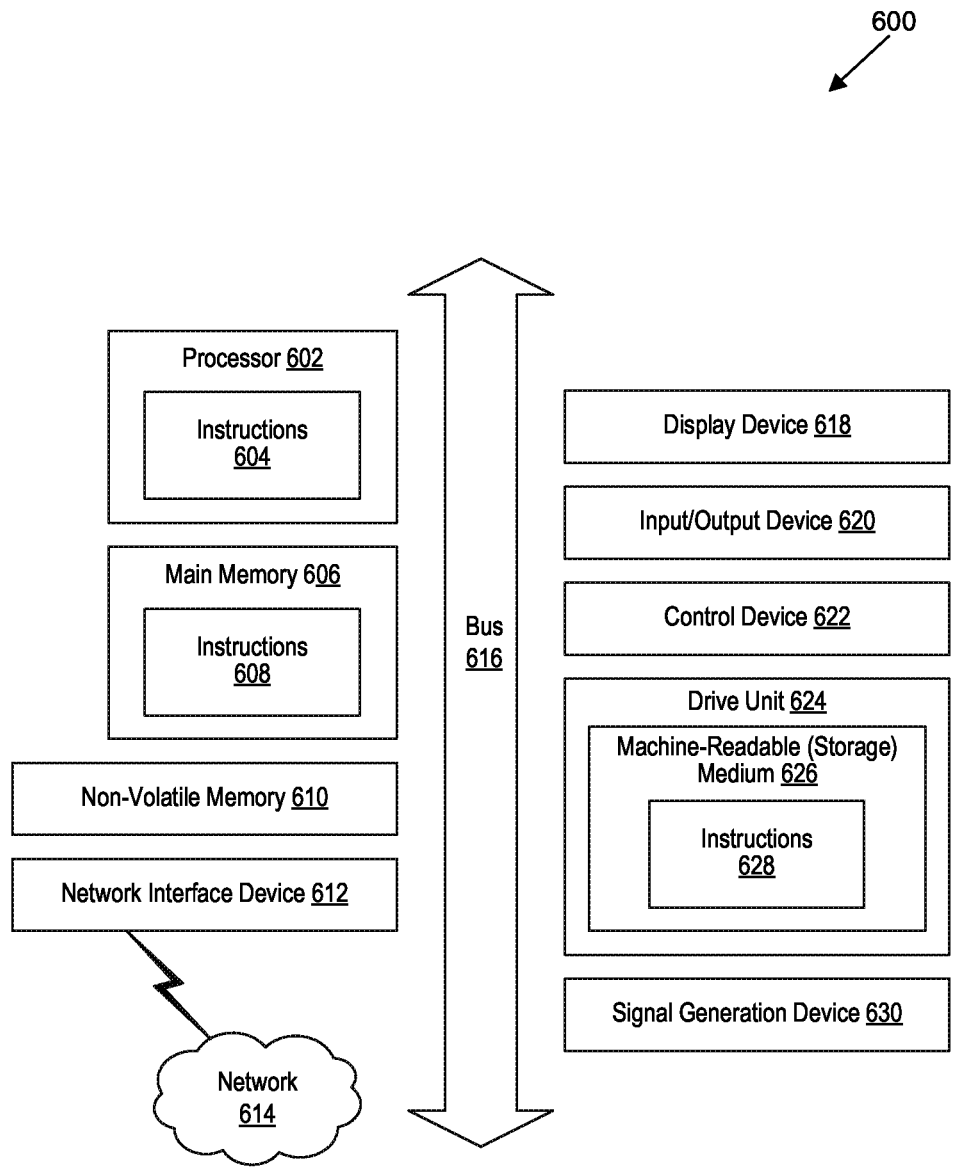
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the Figures and any other components described in this specification can be implemented.

The computer system 600 can take any suitable physical form. For example, the computer system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 600. In some implementations, the computer system 600 can be an embedded computer system, a system-on-chip (SOC), a single-board computer system (SBC), or a distributed system such as a mesh of computer systems, or it can include one or more cloud components in one or more networks. Where appropriate, one or more computer systems 600 can perform operations in real time, near real time, or in batch mode.

The network interface device 612 enables the computer system 600 to mediate data in a network 614 with an entity that is external to the computer system 600 through any communication protocol supported by the computer system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computer system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computer system 600 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. At least one computer-readable storage medium, excluding transitory signals and carrying instructions to categorize a location of a mobile device in relation to a cell tower associated with a wireless telecommunication network, which, when executed by at least one data processor of a system, cause the system to:
　　define multiple regions associated with the cell tower,
　　　　wherein the cell tower is providing wireless communication coverage to the mobile device,
　　　　wherein the multiple regions describe the location of the mobile device in relation to the cell tower,
　　　　wherein the multiple regions include a near region, a middle region, and a far region,
　　　　wherein the near region is nearest to the cell tower, the far region is farthest from the cell tower, and the middle region is between the near region and the far region;
　　periodically send a request to the mobile device to provide an indication of a propagation delay associated with the mobile device,
　　　　wherein the propagation delay indicates a distance between the mobile device and the cell tower;
　　based on the propagation delay, categorize the location of the mobile device in relation to the cell tower into one of the multiple regions associated with the cell tower;
　　receive an indication of a problem in a communication between the mobile device and the wireless telecommunication network; and,
　　based on the one of the multiple regions into which the location of the mobile device is categorized, determine a likely source of the problem,
　　　　wherein the likely source of the problem is the mobile device, a radio network, or a core network.

2. The computer-readable storage medium of claim 1, wherein instructions to define multiple regions associated with the cell tower comprise instructions to:
　　determine a frequency of the communication between the cell tower and the mobile device;
　　based on the frequency of the communication, determine a size of a region around the cell tower,
　　　　wherein the cell tower provides a coverage to the mobile device at the frequency of the communication; and
　　divide the region around the cell tower into multiple regions.

3. The computer-readable storage medium of claim 1, comprising instructions to:
　　determine a type of the communication between the mobile device and the wireless telecommunication network, wherein the type of the communication includes a data session, a voice call, or a messaging;
upon determining that the type of the communication is the data session, receive at an access and mobility management function associated with the wireless telecommunication network the indication of the propagation delay associated with the mobile device; and
upon categorizing the location of the mobile device, store the one of the multiple regions in a call detail record.

4. The computer-readable storage medium of claim 1, comprising instructions to:
determine a type of the communication between the mobile device and the wireless telecommunication network,
wherein the type of the communication includes a data session, a voice call, or a messaging;
upon determining that the type of the communication is the voice call, receive at a telephony application server associated with an IP multimedia subsystem of the wireless telecommunication network the indication of the propagation delay associated with the mobile device; and
upon categorizing the location of the mobile device, store the one of the multiple regions in a call detail record.

5. The computer-readable storage medium of claim 1, comprising instructions to:
determine a type of the communication between the mobile device and the wireless telecommunication network,
wherein the type of the communication includes a data session, a voice call, or a messaging;
upon determining that the type of the communication is the messaging, receive at a messaging server associated with the wireless telecommunication network the indication of the propagation delay associated with the mobile device,
wherein the messaging server includes a rich communication services application server, a short message service center, or an IP multimedia subsystem messaging server; and
upon categorizing the location of the mobile device, store the one of the multiple regions in a call detail record.

6. The computer-readable storage medium of claim 1, wherein the instructions to send the request to the mobile device to provide the indication of the propagation delay comprise instructions to:
send the request to the mobile device to provide a timing advance defined by 3GPP, wherein the timing advance is proportional to two times the propagation delay.

7. The computer-readable storage medium of claim 1, comprising instructions to:
store multiple indications of multiple problems and the one of the multiple regions,
wherein an indication among the multiple indications is associated with the one of the multiple regions;
based on the multiple indications of multiple problems, determine a region among the multiple regions in which a majority of the multiple problems occur;
based on the region, determine a frequent source of the problem; and
tag the frequent source of the problem for repair.

8. The computer-readable storage medium of claim 1, comprising instructions to:
determine whether the mobile device having the problem in communication is in the near region; and
upon determining that the mobile device having the problem in communication is in the near region, determine that radio communication between the mobile device and the cell tower is an unlikely source of the problem and that the likely source of the problem is the mobile device or the core network.

9. A system comprising:
at least one hardware processor; and
at least one non-transitory memory storing instructions, which, when executed by the at least one hardware processor, cause the system to:
define multiple regions associated with a cell tower of a wireless telecommunication network,
wherein the cell tower is providing coverage to a UE,
wherein the multiple regions describe a location of the UE in relation to the cell tower,
wherein the multiple regions include a near region and a far region,
wherein the near region is nearest to the cell tower, and the far region is farthest from the cell tower;
send a request to the UE to provide an indication of a distance between the UE and the cell tower;
based on the distance between the UE and the cell tower, categorize the location of the UE in relation to the cell tower into one of the multiple regions associated with the cell tower;
receive an indication of a problem in a communication between the UE and the wireless telecommunication network; and
based on the one of the multiple regions into which the location of the UE is categorized, determine a likely source of the problem,
wherein the source of the problem includes the UE, a radio network, or a core network.

10. The system of claim 9, wherein instructions to define multiple regions associated with the cell tower comprise instructions to:
determine a frequency of the communication between the cell tower and the UE;
based on the frequency of the communication, determine a size of a region around the cell tower,
wherein the cell tower provides a coverage to the UE at the frequency of the communication; and
divide the region around the cell tower into the multiple regions.

11. The system of claim 9, comprising instructions to:
determine a type of the communication between the UE and the wireless telecommunication network,
wherein the type of the communication includes a data session, a voice call, or a messaging;
upon determining that the type of the communication is the data session, receive at an access and mobility management function associated with the wireless telecommunication network the indication of the distance between the UE and the cell tower; and
upon categorizing the location of the UE, store the one of the multiple regions in a call detail record.

12. The system of claim 9, comprising instructions to:
determine a type of the communication between the UE and the wireless telecommunication network,
wherein the type of the communication includes a data session, a voice call, or a messaging;
upon determining that the type of the communication is the voice call, receive at a telephony application server associated with an IP multimedia subsystem of the wireless telecommunication network the indication of the distance between the UE and the cell tower; and
upon categorizing the location of the UE, store the one of the multiple regions in a call detail record.

13. The system of claim 9, comprising instructions to:
determine a type of the communication between the UE and the wireless telecommunication network,
  wherein the type of the communication includes a data session, a voice call, or a messaging;
upon determining that the type of the communication is the messaging, receive at a messaging server associated with the wireless telecommunication network the indication of the distance between the UE and the cell tower,
  wherein the messaging server includes a rich communication services application server, a short message service center, or an IP multimedia subsystem messaging server; and
upon categorizing the location of the UE, store the one of the multiple regions in a call detail record.

14. The system of claim 9, wherein the instructions to send the request to the UE to provide the indication of the distance between the UE and the cell tower comprise instructions to:
send the request to the UE to provide a timing advance defined by 3GPP; and
determine the distance between the UE and the cell tower based on the timing advance.

15. The system of claim 9, comprising instructions to:
store multiple indications of multiple problems and the one of the multiple regions,
  wherein an indication among the multiple indications is associated with the one of the multiple regions;
based on the multiple indications of multiple problems, determine a region among the multiple regions in which a majority of the multiple problems occur;
based on the region, determine a frequent source of the problem; and
tag the frequent source of the problem for repair.

16. The system of claim 9, comprising instructions to:
determine whether the UE having the problem in the communication is in the near region;
upon determining that the UE having the problem in the communication is in the near region, determine that the radio network between the UE and the cell tower is an unlikely source of the problem and that the likely source of the problem is the UE or the core network.

17. A system comprising:
at least one hardware processor; and
at least one non-transitory memory storing instructions, which, when executed by the at least one hardware processor, cause the system to:
  determine a frequency of the communication between a mobile device and a cell tower associated with a wireless telecommunication network, wherein the cell tower is providing coverage to the mobile device;
  based on the frequency of the communication, determine a size of a region around the cell tower,
    wherein the cell tower provides a coverage to the mobile device at the frequency of the communication; and
  divide the region around the cell tower into multiple regions associated with the cell tower,
    wherein the multiple regions describe a location of the mobile device in relation to the cell tower,
    wherein the multiple regions include a near region, a middle region, and a far region,
    wherein the near region is nearest to the cell tower, the far region is farthest from the cell tower, and the middle region is between the near region and the far region;
  send a request to the mobile device to provide an indication of a distance between the mobile device and the cell tower;
  based on the distance between the mobile device and the cell tower, categorize the location of the mobile device in relation to the cell tower into one of the multiple regions associated with the cell tower; and
  upon categorizing the location of the mobile device, store the one of the multiple regions in a call detail record.

18. The system of claim 17, comprising instructions to:
receive an indication of a problem in a communication between the mobile device and the wireless telecommunication network;
based on the one of the multiple regions into which the location of the mobile device is categorized, determine a likely source of the problem,
  wherein the source of the problem includes the mobile device, a radio network, or a core network.

19. The system of claim 17, comprising instructions to:
determine a type of the communication between the mobile device and the wireless telecommunication network,
  wherein the type of the communication includes a data session, a voice call, or a messaging;
upon determining that the type of the communication is the data session, receive at an access and mobility management function associated with the wireless telecommunication network the indication of the distance between the mobile device and the cell tower; and
upon categorizing the location of the mobile device, store the one of the multiple regions in a call detail record.

20. The system of claim 17, comprising instructions to:
determine a type of the communication between the mobile device and the wireless telecommunication network,
  wherein the type of the communication includes a data session, a voice call, or a messaging;
upon determining that the type of the communication is the voice call, receive at a telephony application server associated with an IP multimedia subsystem of the wireless telecommunication network the indication of the distance between the mobile device and the cell tower; and
upon categorizing the location of the mobile device, store the one of the multiple regions in a call detail record.

* * * * *